E. G. TODT.
MOLDING MACHINE.
APPLICATION FILED AUG. 13, 1909.
977,687.
Patented Dec. 6, 1910.
5 SHEETS—SHEET 1.
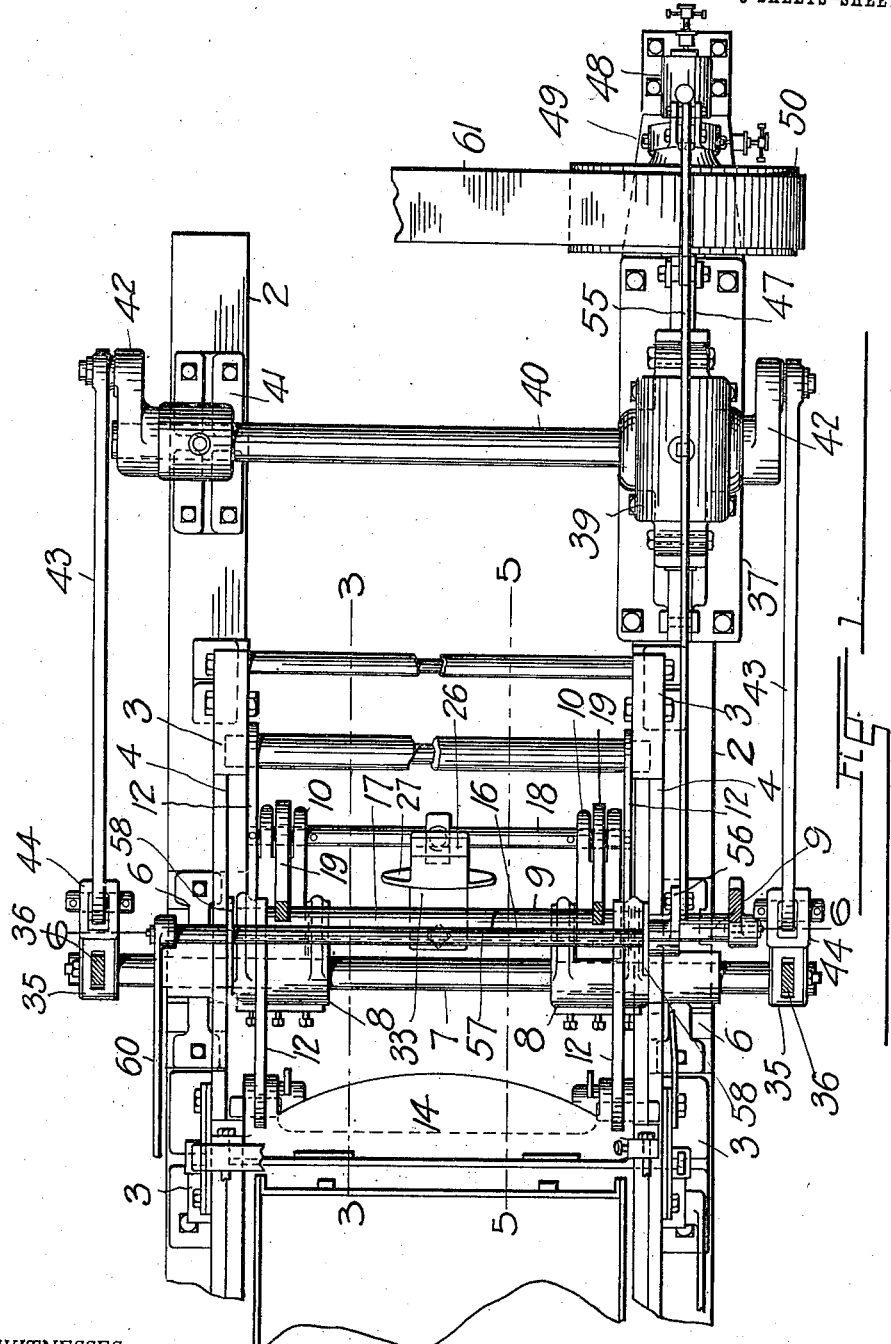
WITNESSES:
F. H. Cuno.
M. L. Geary.
INVENTOR.
Edward G. Todt
BY
ATTORNEY.

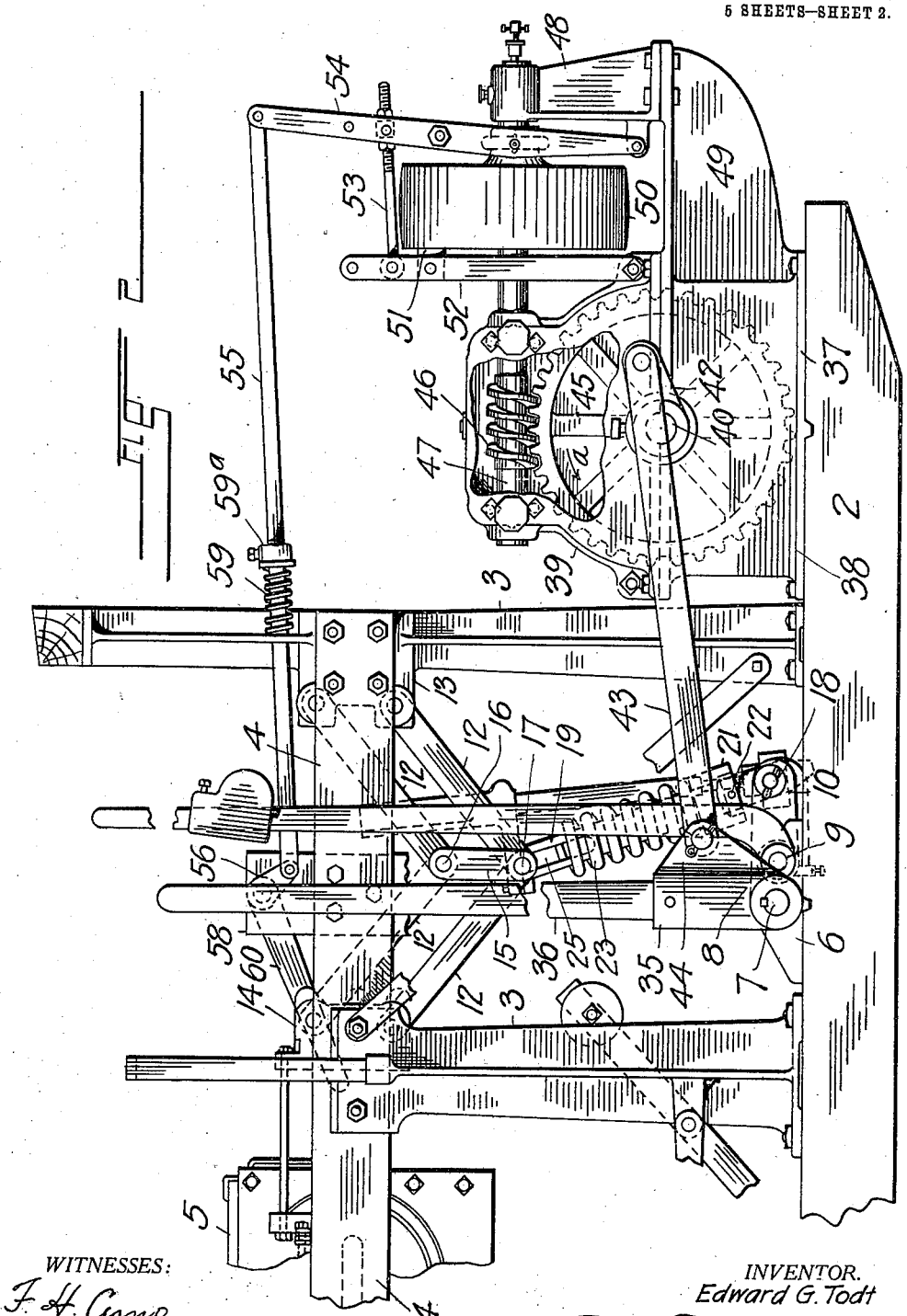

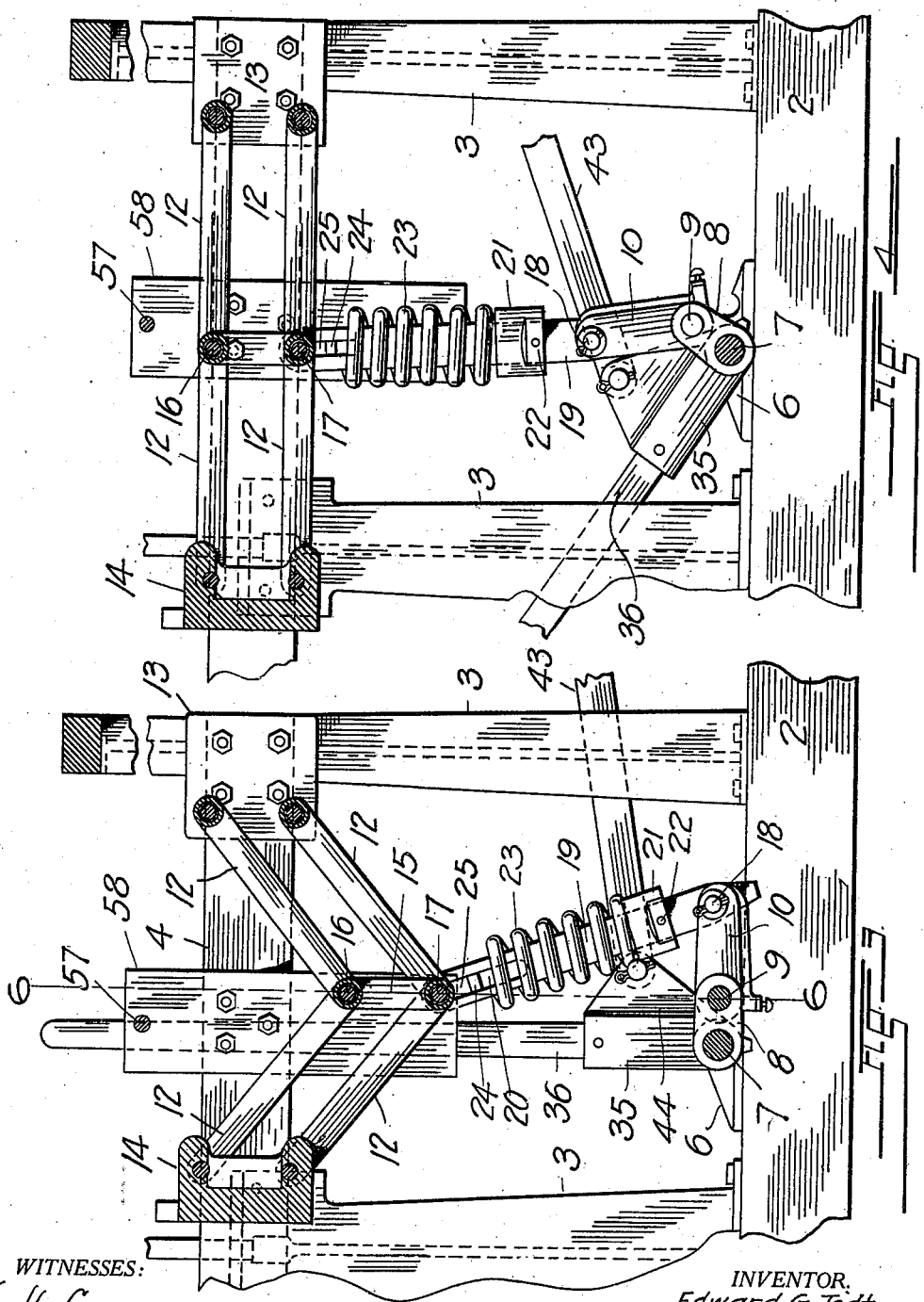

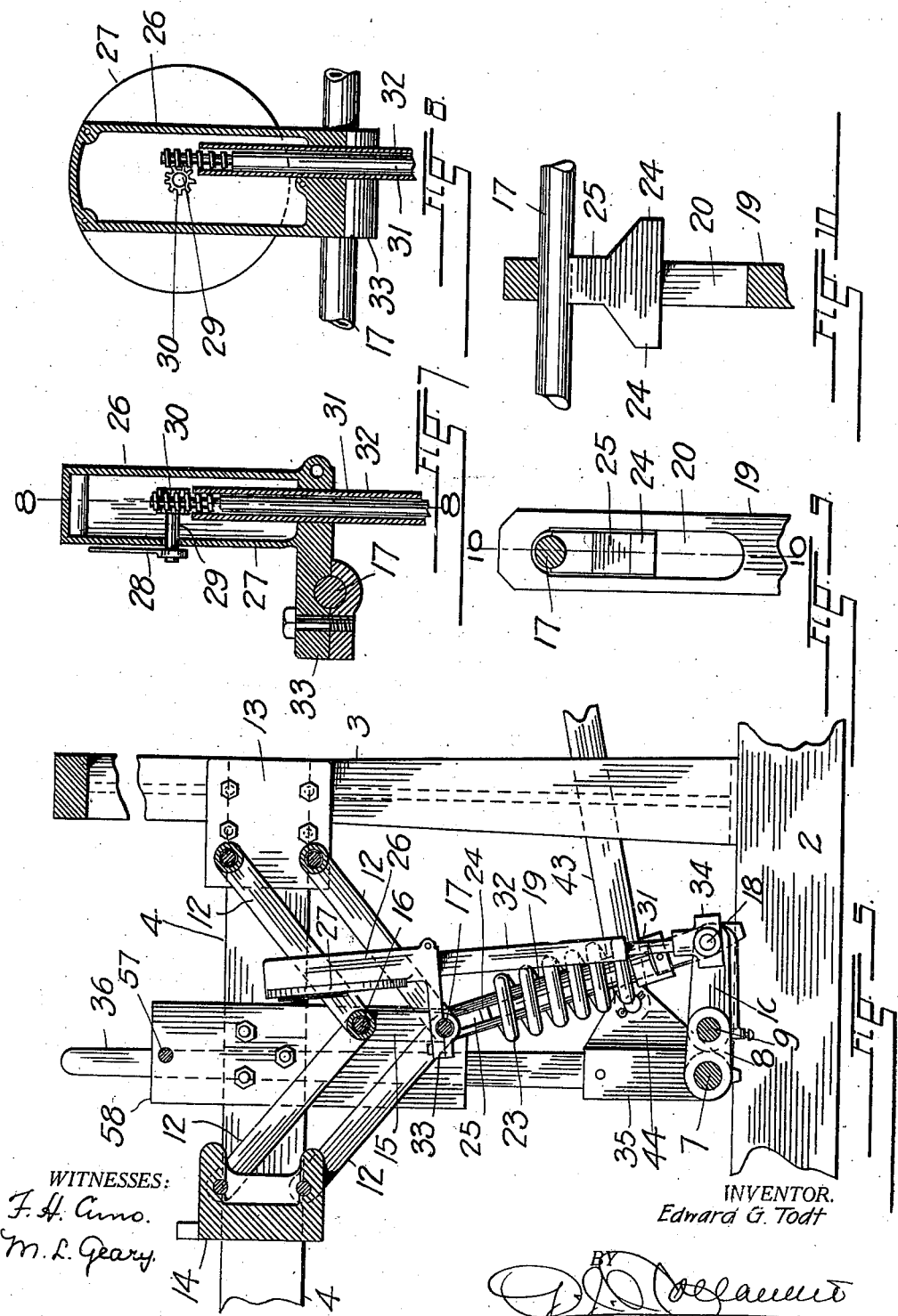

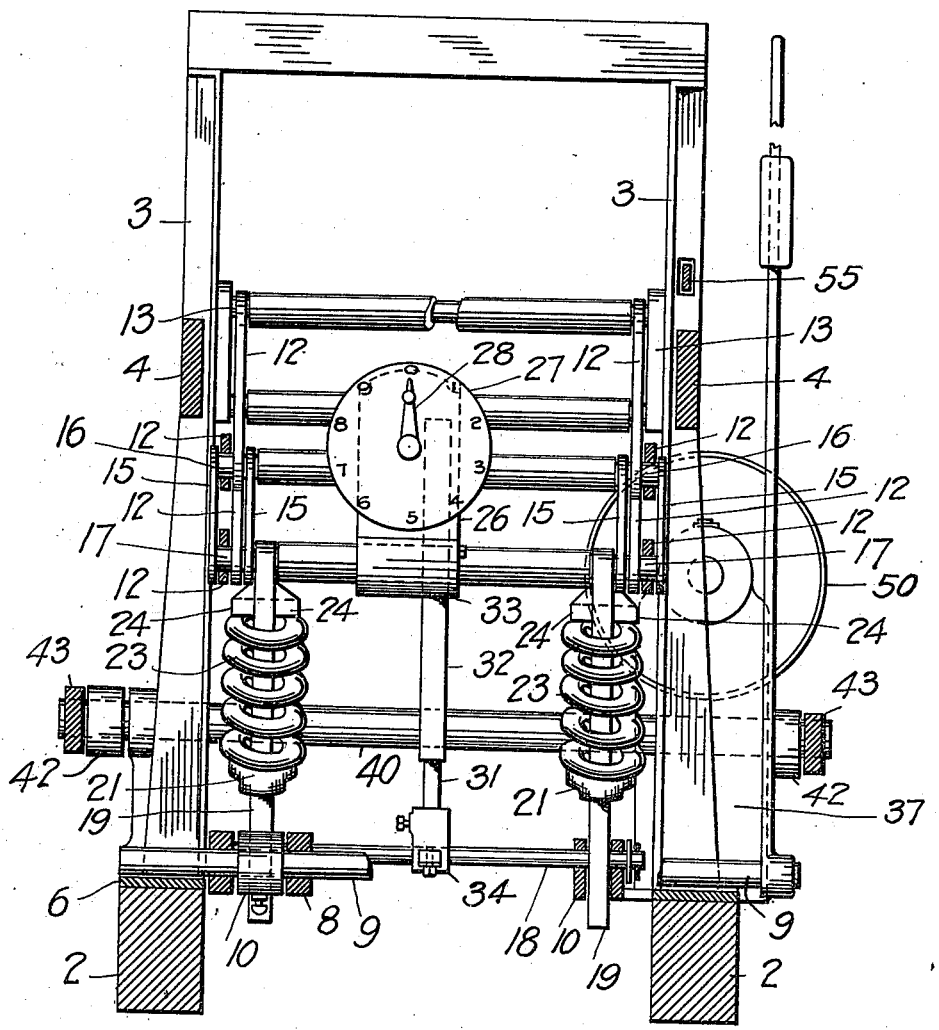

UNITED STATES PATENT OFFICE.

EDWARD GEORGE TODT, OF MANITOWOC, WISCONSIN, ASSIGNOR TO J. A. FERGUSON, OF DENVER, COLORADO.

MOLDING-MACHINE.

977,687.   Specification of Letters Patent.   Patented Dec. 6, 1910.

Application filed August 13, 1909. Serial No. 512,720.

*To all whom it may concern:*

Be it known that I, EDWARD GEORGE TODT, citizen of the United States of America, residing at Manitowoc, in the county of Manitowoc and State of Wisconsin, have invented certain new and useful Improvements in Molding-Machines, of which the following is a specification.

This invention relates to certain new and useful improvements in machines for molding blocks and other articles of plastic material and its object resides, 1st—in the provision of a power-driven mechanism whereby a reciprocating movement is imparted to the movable pressure-head which, in coöperation with the relatively stationary mold, is instrumental in producing the molded article. 2nd—in the provision of means associated with said actuating mechanism, whereby its movement may be instantaneously arrested at any desired point. 3rd—in the provision of a yielding element in the mechanism employed to transmit the movement of the operating mechanism to the pressure head, for the purpose of preventing excessive pressure upon the mold and the transmission means, should the former be supplied with the plastic mixture beyond its capacity, and 4th—in the provision of an indicatory device which, through the instrumentality of the before mentioned transmission mechanism with which it is operatively connected, will denote by the movement of a pointer upon a graduated dial, the degree of pressure exerted by the movable pressure head upon the plastic substance in the mold.

Although the above enumerated improvements are adapted for use on molding machines of different design, the construction shown and described in the present application is particularly suitable for use in connection with machines of the type-exemplified in the United States Patent #821,270 of May 22—1906, in which the movement of a manually or power-driven operative element is transposed into a reciprocating movement of the pressure head through the agency of one or more toggles, the members of which connect, respectively, with said pressure head and with a stationary abutment on the frame of the machine.

An embodiment of my invention is illustrated in the accompanying drawings, in the various views of which like parts are similarly designated and in which—

Figure 1, represents a plan view of the improved molding-machine, a portion of the mold and adjacent parts of the frame having been omitted. Fig. 2, a side elevation of the same. Figs. 3, and 4, vertical sections taken along the line 3—3 Fig. 1, drawn to an enlarged scale and respectively showing the toggles included in the power-transmission mechanism, in the deflected and alined positions. Fig. 5, an enlarged vertical section taken along the line 5—5 Fig. 1. Fig. 6, a vertical transverse section taken along the line 6—6 Figs. 1 and 3, drawn to an enlarged scale. Fig. 7, a vertical central section through the upper portion of the dial-indicator, shown in Figs. 5 and 6. Fig. 8, a longitudinal section taken along the line 8—8 Fig. 7. Fig. 9, an elevation of the upper portion of the bar which connects the toggles of the power-transmission mechanism with the rocker-shaft and Fig. 10, a longitudinal section taken along the line 10—10 Fig. 9.

Referring to the drawings by numerical reference characters, let the numeral 2 designate the parallel bed timbers of the molding machine, 3 the standards supported thereon and 4 the horizontal side rails which being rigidly secured upon said standards, carry near one of their extremities, the mold-box 5 in which the molded article is produced.

Revolubly mounted in boxes 6, transversely of the timbers 2, is a shaft 7 whose oscillatory movement is transposed by means of links 8 into an arcual movement of a subsidiary shaft 9, which is normally supported in parallel relation to the first named shaft, in seats formed in extensions of the boxes 6. The shaft 9 is provided at opposite sides of the machine, with rocker-arms 10, the free extremities of which, are by means of an appliance the construction of which will hereinafter be described, connected with the lower ones of two sets of coöperative toggles 12, the extremities of which are respectively connected with stationary abutments 13 forming part of the rearmost standards 3, and with a pressure-head 14 which is slidably supported upon the side rails 3 and which serves to compress the plastic material within the mold-box 5.

The toggles employed in transmitting the movement of the rocker-arms 10 to the pressure head, comprise two pairs which are applied at opposite sides of the machine in close proximity to the inner surfaces of the side rails 3. The toggles comprised in each pair are coöperatively connected by means of vertically disposed links 15, while the corresponding toggles of the two pairs at opposite sides of the machine are connected by means of transverse rods 16 and 17 which serve as pivot axles, upon which the members of which the toggles are composed, are movably united. Distance sleeves surrounding the rods 16 and 17, serve to hold the toggle-members against lateral displacement.

The bifurcated rocker-arms 10, are connected at their outer extremities by a wrist-rod 18, and the above mentioned appliance by means of which the rocker-arms 10 are connected with the toggles 12, consists of two bars 19 the lower extremities of which project between the forked extremities of the arms 10 and are movably mounted upon the wrist 18, while their opposite ends are formed with longitudinal slots 20 through the upper portions of which, the rod 17 which connects the lower toggles 12, loosely projects.

Each of the bars 19 carries upon its lower portion, a collar 21 which is rigidly secured thereto by means of a pin 22 and which provides a stop or abutment for a spring 23 which is coiled around the bar and engages at its upper extremity, outwardly projecting shoulders 24 on a head 25 whose upper, concave end engages the peripheral surface of the aforementioned rod 17.

To indicate the amount of pressure exerted upon the plastic material within the box 5 by the pressure-head 14, I provide an indicative instrument which, in its action, depends upon the variations in the distance between the rods 17 and 18 connected by the yielding appliance, above described. The instrument referred to, is composed of a casing 26, provided at one of its sides, with a circular dial 27, upon whose graduated face, the degree of pressure exerted by the pressure head upon the plastic matter in the mold box, is indicated by means of a pointer 28 attached at the end of an arbor 29 which revolubly projects through a central opening in the dial, into the interior of the casing and which carries a pinion 30 the peripheral teeth of which mesh with those of a rack 31 longitudinally movably fitted in a tubular extension 32 of the casing 26. The latter is provided with a knuckle 33 by means of which it is pivotally connected with the rod 17 of the toggles 12 and the rack bar has, at its lower extremity, a transversely bored head 34 by which it is movably secured upon the wrist-rod 18, which connects the rocker-arms 10 of the shaft 9. When, by compression of the springs 23, the distance between the rods 17 and 18 decreases, the consequent longitudinal movement of the rack bar 31 in the tubular housing 32, will cause the pinion 30 and the therewith associated hand 28, to move about their axis, and inasmuch as the amount of compression of said springs is proportionate to the degree of pressure exerted by the head 14 upon the plastic material in the mold box 5, this degree will be indicated upon the dial 27, by the aforesaid movement of the pointer.

The transverse shaft 7, is provided at its extremities, with crank-arms 35 which are formed with longitudinal sockets for the reception of hand-levers 36 which are employed when it is desired to operate the machine manually.

Mounted upon one of the bed-timbers 2 is the operating mechanism ordinarily employed to impart an oscillatory movement to the shaft 7, which movement is, by the hereinbefore described toggle-mechanism transposed into a reciprocating movement of the pressure head 14. The operating mechanism referred to consists, to this end, of a dust-proof casing 37 consisting of a base-portion 38 and a removably secured cover 39; a shaft 40 projecting transversely through the casing 37, is revolubly supported in a bearing forming part of the latter and in a journal-box 41 which is mounted upon the bed-timber 2 at the opposite side of the machine, and this shaft is provided with parallel cranks 42 which are connected by means of pitmen 43, with lugs 44 of the crank arms 35 on the oscillatory shaft 7. The shaft 40 is furthermore provided with a worm-wheel 45 which being disposed within the casing 37, meshes with a superposed worm 46 upon a shaft 47 which is revolubly mounted in bearings on the cover 39, at right angles to the crank-shaft 40. The worm-shaft 47, protruding beyond the casing, is supported at its outer extremity, in a journal-bearing 48, which is mounted upon a laterally projecting bracket 49 of the base 38, and this shaft carries a combined friction-wheel and pulley 50, the vertical friction-face of which is normally engaged by a brake-block 51 upon a rocker arm 52 which is pivotally mounted upon the casing 37. The arm 52 is connected by means of a longitudinally adjustable rod 53, with a lever 54 which is fulcrumed at its lower extremity, upon a lug projecting from the journal bearing 48 and whose opposite end connects by means of a rod 55, with a crank 56 on a shaft 57 which is revolubly mounted, transversely of the machine, in alined openings of plates 58 secured upon the side rails 4. A coiled spring 59 which engages a collar 59ª on the rod 55 and a side of the standard 3 through which said rod projects, serves to maintain the block 51 in frictional contact with the face of the wheel 50, while a hand-lever 60 secured upon the shaft 57, is manipulated to disengage said block from the wheel, while the machine is in action. The pulley 50 is connected by means of a belt, 61, shown in Fig. 1 of the drawings, with a suitable and conveniently located motor or other source of energy.

Having thus described the mechanical construction of my improved molding machine, its operation will be readily understood:— When the press is at rest and the operative parts are in the position shown in Figs. 2 and 5, the friction-block is in engagement with the face of the pulley 50, thereby holding the latter against rotation, even though the belt 61 is in motion. After the mold box 5 has been filled with the plastic mixture, the pulley 50 is released by manipulation of the hand-lever 60 on the shaft 57, with the result that by action of the moving belt 61, a rotatory movement is imparted to the shaft 47, and the therewith associated worm 46. The movement of the latter is through the instrumentality of the worm-wheel 45, transposed into a relatively slow rotatory motion of the crank shaft 40, which motion is transposed by the transmission means hereinbefore described, into a reciprocating movement of the pressure head 14, until the worm-wheel has completed one revolution when, by releasing the hand lever 60, the movement of the operating mechanism is instantaneously arrested by the frictional contact of the block 51, induced by expansion of the spring 58. In case the mold is filled beyond its capacity and the progress of the pressure-head to the end of its stroke, is, in consequence, obstructed, the yielding connection between the toggles 12 and the rocker-arm 10 will permit deflection of the former independent of the said arms, with the effect that all resistance to the movement of the crank shaft 40 during the first half of its revolution (in the direction of the arrow *a* Fig. 2) is obviated, the rotatory movement of the same is rendered equable, and detrimental strain upon the members of the transmission mechanism is prevented.

By observation of the movements of the pointer 28 upon the graduated dial of the indicating instrument, the amount of pressure exerted upon the plastic matter within the mold, may be determined, as hereinbefore explained.

While I have shown and described my invention in the best form now known to me, I wish it understood that various changes in the form, proportion and minor details of the construction may be resorted to without departure from the principle of the invention.

What I claim and desire to secure by Letters Patent is:—

1. In a molding-machine, a reciprocating pressure head, and an actuating mechanism operatively connected therewith, and comprising a rotatory crank shaft, a belt-pulley operatively associated therewith, a lever, a brake-block connected therewith so as to engage a face of said pulley, a spring adapted to resiliently maintain said block in engagement with said face, and a means for moving said lever about its fulcrum whereby said block is moved against the action of said spring.

2. In a molding-machine, a reciprocating pressure-head, and an actuating mechanism operatively connected therewith and comprising a crank shaft, a worm-wheel carried thereby, a worm meshing with said wheel, a belt-pulley operatively associated with said worm, a brake block normally in frictional engagement with a face of said pulley, and a means for disengaging said block from said face.

3. In a molding-machine, a movable pressure-head, a relatively stationary abutment, a toggle composed of pivotally connected members, connecting the two, a rock shaft, a laterally projecting arm connected therewith, a yielding connection between said arm and said toggle, and an indicatory device comprising a casing connected with the pivotal connection between the toggle-members and carrying a dial, a pointer movable upon the latter, a pinion connected therewith, and a longitudinally movable rack connected with said arm, in mesh with said pinion.

4. In a molding-machine, a movable pressure-head, a relatively stationary abutment, a toggle composed of pivotally connected members, connecting the two, a rock shaft, a laterally projecting arm connected therewith, a yielding connection between said arm and said toggle, and an indicatory device comprising a driving member and a driven member respectively connected with said arm and with the pivotal connection between the toggle-members, and an indicating member connected with said driven member.

5. In a molding machine, a movable pressure head, a relatively stationary abutment, a toggle connecting said head and abutment and composed of pivotally connected arms, a rocker arm, a bar connected at one end to said rocker arm and formed at its other end with a longitudinal slot wherein the pivotal connection between said toggle arms is loosely received, a head movable in said slot and engaging said pivotal connection, a member secured to said bar adjacent the first-mentioned end thereof, and an expansible spring interposed between said head and member and engaged at opposite ends with the same.

In testimony whereof I have affixed my signature in presence of two witnesses.

EDWARD GEORGE TODT.

Witnesses:
    PEARL SMART,
    E. G. NASH.